United States Patent [19]

MacDonald

[11] Patent Number: 5,203,982
[45] Date of Patent: Apr. 20, 1993

[54] CATION EXCHANGE MEMBRANES

[75] Inventor: Russell J. MacDonald, Watertown, Mass.

[73] Assignee: Ionics, Incorporated, Watertown, Mass.

[21] Appl. No.: 821,675

[22] Filed: Jan. 16, 1992

Related U.S. Application Data

[63] Continuation of Ser. No. 639,852, Nov. 1, 1991, abandoned, which is a continuation-in-part of Ser. No. 422,212, Oct. 16, 1989, abandoned.

[51] Int. Cl.$^5$ .......................... B01D 61/42; C08J 5/20
[52] U.S. Cl. ..................................... 204/301; 521/27; 521/32; 521/1
[58] Field of Search .................. 521/27, 32; 204/252, 204/296, 301; 526/287

[56] References Cited

U.S. PATENT DOCUMENTS

| | | | |
|---|---|---|---|
| 3,236,881 | 2/1966 | Pieffer | 526/287 |
| 3,887,499 | 6/1975 | Hodgdon, Jr. | 204/296 |
| 4,344,933 | 8/1982 | Siegl et al. | 424/330 |
| 4,511,712 | 4/1985 | Florence | 528/488 |
| 4,710,555 | 12/1987 | Peiffer et al. | 526/240 |
| 4,851,100 | 7/1989 | Hodgdson et al. | 204/296 |
| 4,946,916 | 8/1990 | Pieffer et al. | 526/240 |
| 5,045,171 | 9/1991 | MacDonald | 204/301 |

FOREIGN PATENT DOCUMENTS 967956  8/1965  United Kingdom.

Primary Examiner—Thurman K. Page
Assistant Examiner—Peter F. Kulkosky
Attorney, Agent, or Firm—Norman E. Saliba

[57] ABSTRACT

This invention is directed to highly crosslinked, substantially water insoluble, cation exchange membranes prepared from homogeneous solutions comprising at least one substantially water soluble polar solvent (including water) at least one substantially water soluble polymerizable monomeric onium styrene sulfonate McKee type salt and/or substantially water soluble monomeric, polymerizable derivative thereof and at least one substantially water insoluble, di-, tri- or polyethylenic (vinyl or related) crosslinking monomer copolymerizable with said sulfonate salt. Membranes, especially useful in electrodialysis, may be obtained in "one-step" processes which require no further chemical reactions after polymerization.

10 Claims, No Drawings

CATION EXCHANGE MEMBRANES

This application is a continuation of application Ser. No. 07/639,852 filed Nov. 1, 1991 (now abandoned) which was a continuation-in-part of application Ser. No. 07/42,212 filed Oct. 16, 1989 (now abandoned).

FIELD OF THE INVENTION

This invention is directed to highly crosslinked, substantially water insoluble, cation exchange membranes having equivalent weights of less than about 1000 prepared from homogeneous solutions comprising a mixture of:

(a) one or more substantially water soluble McKee type salts comprising monomeric styrene sulfonate anions and/or monomeric, anionic, polymerizable analogues thereof and non-polymerizable, organic (preferably per-organic) onium cations;

(b) one or more substantially water insoluble, monomeric di-, tri- or polyethylenic vinyl or related crosslinking compounds copolymerizable with such styrene sulfonate and/or such anionic analogue thereof, such crosslinking compound present to the extent of at least about 0.17 to about 1.7 equivalents of available crosslinks per equivalent of such styrene sulfonate and/or analogue thereof;

with one or more non-polymerizable solvents selected from the group consisting of water and substantially water soluble, nonpolymerizable, polar solvents having boiling points at atmospheric pressure in the substantially pure state of not less than about 100° C., such one or more solvents present to the extent of from about 20% to about 60% of solution by volume and characterized by being a mutual solvent for said mixture of one or more salts and one or more crosslinking compounds when present to such extent. Membranes may be prepared from such solutions by "one-step" procedures, which membranes are electro-chemically superior to similar membranes made by sulfonating crosslinked polystyrene sheets and are particularly useful in electrodialysis and related processes.

DESCRIPTION OF THE PRIOR ART

The classical technique for the production of cationexchange membranes (U.S. Pat. No. 2,731,411-Clarke) involves polymerizing a non-ionic, substantially water insoluble, di-, tri- or polyethylenic (vinyl or related) crosslinking monomer (for example divinyl benzene) with a substantially water insoluble monovinyl aromatic monomer (such as styrene) copolymerizable therewith in a water insoluble, aromatic, non-polymerizable solvent ("NP," such as diethyl benzene) on and/or in a reinforcing fabric. The resulting solid polymer in sheet or membrane form is washed with a water insoluble, organic solvent (such as ethylene dichloride) to remove and replace the NP. The sheets are then reacted with a solution of modified sulfur trioxide in, for example, waterinsoluble ethylene dichloride (see e.g., U.S. Pat. No. 2,962,454) to form sulfonate groups covalently bound to the crosslinked polystyrene. Washing for example with methanol and neutralization with for example aqueous sodium bicarbonate solution yields a finished membrane with strongly acid cation-exchange properties. Such process has the disadvantage that all the monomers employed are water insoluble. Hence the polymerization and subsequent reactions are carried out in water-insoluble solvents, thus producing chemical disposal problems. Solvents typically used in the above described classic process have modest cohesive energy densities (e.g., Hildebrand solubility parameters in the range of from about 8 to about 10 calories $^{0.5}$ cm $^{-1.5}$ and essentially zero dipole moments (e.g. low frequency dielectric constants less about 10), i.e. are generally described as non-polar and water insoluble.

A further disadvantage of the classic process is that the sulfonation occurs less heavily in the interior of the polymerized sheet than at the surface. Hence membranes are produced which have electrical resistances which are higher than would be the case if the ion exchange groups were substantially uniformly distributed, i.e., on a scale of microns or less.

Graydon et al. (J. Phys. Chem. (1955) 59 p. 86 et seq., (1956) 60 p. 750 et seq. and (1957) 61 p. 164 et seq.) describe cation exchange membranes prepared from 50 percent divinyl benzene of commerce and the propyl ester of parastyrene sulfonate. The resulting membranes are then hydrolyzed in boiling 5% caustic solution from 30 hours to 5 days to produce alkali metal sulfonate salt groups therein. The propyl ester of parastyrene sulfonate was prepared according to the method of Graydon et al. described in Can. J. Chem. (1954) 32 p. 143 et seq. The overall process is very expensive, inconvenient and commercially impractical and has been used therefore solely for highly fundamental research purposes. Inorganic cation parastyrene sulfonate salts are prepared for example by sulfonating betabromo ethyl benzene and dehydrohalogenating the product with an inorganic hydroxide. The sodium and potassium salts are commercially available at present. Inorganic cation metastyrene sulfonate salts are prepared for example from sodium meta iodobenzene sulfonate and ethylene in dimethyl formamide in the presence of sodium acetate and a palladium/activated carbon catalyst (see e.g. Japanese Patent (81) 25,465).

Florence (U.S. Pat. No. 4,511,712) discloses the isolation in the inorganic ammonium (not organic quaternary ammonium) salt form- or alternatively in the non-quaternary organic amine salt form- of solid, substantially water insoluble, lightly sulfonated, noncrosslinked, linear polystyrene from solution in the inorganic ammonium salt form (not in the organic quaternary ammonium salt form)- or alternatively from solution in the organic amine salt form- in water insoluble, non polar organic solvents (preferably the non polar, water insoluble methylene chloride) by blending such solution of water insoluble, lightly sulfonated polystyrene salt with a solution of an inorganic ammonium salt (not organic quaternary ammonium salt)- or alternatively of an organic amine salt- in any case in polar, water soluble, organic liquid (preferably the polar, water soluble methanol) which is not a solvent for the water insoluble lightly sulfonated polystyrene salt. The salt in the latter solution is one in which the cation is identical to the cation of the salt form of the lightly sulfonated polystyrene and is preferably an (inorganic) ammonium salt ($NH^+_4$), not an organic quaternary ammonium salt), especially (inorganic) ammonium chloride. Quaternary ammonium salts are nowhere mentioned in Florence and would not be effective since, as will be shown in the present application, they would tend to solubilize the water insoluble lightly sulfonated polystyrene in water soluble, polar solvents which is contrary to the goal of Florence. Non-quaternary, organic-amines are listed in col. 2 lines 53 through 59 alternates to the preferred inorganic ammonium ("$NH^+_4$") ions. The water insoluble lightly sulfonated polystyrene is referred to in Florence as an "ionomer". According to the Kirk-Othmer Encyclopedia of Chemical Technology 3d Ed., Supplement Vol., p 546, an "ionomer" has a maximum of about 10 mol percent ionic groups (see also W. MacKnight et al., J. Macromol. Rev. 16, 41 (1981)). Ionomers are therefore insoluble in water. In Exs 1 and 2 of Florence, one out of every 21.2 styrene mers are sulfonated i.e. the polymer has less than 5 mol percent ionic groups. The equivalent weight is about 2290 whereas the equivalent weight of the product of Ex 1 below of the present application is 529. (Exs 3 and 4 of Florence pertain to unsulfonated styrene-acrylic acid copolymers having in that case about 7 mol percent ionic groups). It is such low degree of sulfonation which permits the lightly sulfonated non-crosslinked, linear polystyrene salt of Florence to be soluble in methylene dichloride and not in methanol or water. The solubility parameters for methylene dichloride, methanol and water are about 9.9, 14.6 and 23 resp., the dielectric constants 9, 34 and 80 resp. In Exs 1 and 2 of Florence the (non-quaternary) inorganic ammonium salt of lightly sulfonated non-crosslinked, linear polystyrene is dissolved in methylene dichloride and precipitated by methanol.

Turner (U.S. Pat. No. 4,540,762) discloses water soluble (i.e. linear, non-crosslinked) alternating copolymers of sodium-N-(4-sulfophenyl) maleimide and sodium styrene sulfonate. The sodium of the latter may be replaced by a member of the group consisting of H, Li, K, Rb, Cs, Fr, Be, Mg, Ca, Sr, Ba, Ra, Cu, Ag, Au, Zn, Cd, Hg and organic tertiary amines. Inorganic ammonia, organic primary and secondary amines and organic quaternary ammonium cations are not recited or implied. No crosslinking compound and in particular no water-insoluble ethylenic crosslinking compound is recited or implied. In fact Turner, aimed at water soluble polyelectrolytes, teaches away from crosslinking compounds.

Distler (U.S. Pat. No. 3,236,881) discloses the preparation of monomeric organic quaternary ammonium salts of vinyl sulfonic acid and of non-crosslinked, linear, water soluble co- and terpolymers of such organic quaternary ammonium vinyl sulfonates. Monomeric organic quaternary ammonium styrene sulfonate salts or monomeric derivatives thereof are not disclosed and polymers prepared from such salts or derivatives are not disclosed.

Siege et al, (U.S. Pat. No. 4,344,933) discloses a lightly crosslinked (2 to 5%), sulfonated, granular copolymer of styrene and divinyl benzene. It is used to absorb N,N'-bis-[2-(3', 4'-dihydroxy phenyl)-2-hydroxy ethyl] hexamethylene diamine to create a slow release medication. Monomeric organic quaternary ammonium styrene sulfonate salts or monomeric derivatives thereof are not disclosed. Polymers prepared from such salts or derivatives are not disclosed.

Fujiwara et al (U.S. Pat. No. 3,963,662) discloses coacervate, nonexchange membranes prepared by mixing non-crosslinked, linear, water soluble polymers of sodium para styrene sulfonate with noncrosslinked, linear,, water soluble cationic polyelectrolytes such as trimethyl ammoniummethylated poly-parahydroxy styrene bromide, N,N-dimethyl-N-benzyl ammonium methylated poly parahydroxy styrene chloride, polyvinyl benzyl trimethyl ammonium chloride. Monomeric organic quaternary ammonium styrene sulfonate salts or polymerizable monomeric derivatives thereof are not disclosed. Polymers prepared from such monomeric styrene or derivative salts are not disclosed.

Cation exchange membranes preferably have ion exchange capacities in excess of about 1 milligram-equivalent per gram of dry contained ion exchange resin (i.e. excluding any electrochemically inert reinforcing materials), more preferably in excess of about 1.5 milligram-equivalents, most preferably in excess of about 1.7 milligram- equivalents, that is to say, gram equivalent weights preferably less than about 1000 grams, more preferably less than about 667 grams, most preferably less than about 588 grams. To prevent excessive swelling and/or spalling and to assure low co-ion transport numbers, such preferred membranes must be highly crosslinked e.g. there is preferably at least about 0.25 mols of available cross-links per equivalent of ion-exchange capacity if reinforcing materials are not used otherwise at least about 0.17 mols. Further the nonpolymerizable solvent is preferably in the range of from about 20 to about 60 volume percent of the polymerizable solution. Hence the concentration of polymerizable monomers is very high (i.e. 40 to 80 volume percent) of which the vinyl or related crosslinking monomer is a substantial fraction (e.g. 20 to 65 mol percent available crosslinks per mol of polymerizable monomers).

The volume percent of non-polymerizable solvent is calculated as:

$$\frac{100 \, \Sigma_i \frac{W_i}{P_i}}{V_s}$$

where $\Sigma_i$ means the sum over all the one or more solvent components i, Wi is the weight of commercially pure solvent component i, Pi is the density of said solvent component and Vs is the total volume of the final polymerizable solution, all expressed in consistent units. For example in the example below the solvent consists of four components: 2-pyrrolidone, water, diethyl benzene (a minor component of the commercial divinyl benzene and the benzyl trimethyl ammonium anions.

By "available crosslinks" is meant 1 less than the average number of polymerizable ethylenic moieties in the crosslinking monomers. For example 100% divinyl benzene has 1 mol (or 1 equivalent) of available crosslinks per mol as does ethylene glycol dimethacrylate and divinyl sulfate; trivinyl cyclohexane has 2 mols ( or 2 equivalents) of available crosslinks per mol; and pentaerythritol tetramethacrylate has 3 mols/or 3 equivalents of such available crosslinks per mol.

Preferred crosslinking monomers (e.g. divinyl benzene and ethylene glycol dimethacrylate) are generally water insoluble whereas monomeric inorganic styrene sulfonate salts are highly water soluble. It has therefore until now proven impossible to make satisfactory cation exchange membranes by combining the necessary high concentration of such salts and such cross-linking monomers in commercially available solvents or mixtures of such solvents and thereafter polymerizing such salts and monomers. Nevertheless it was believed that cation exchange membranes made in such way may have a more nearly uniform distribution of ion exchange groups than those membranes made in the classic way according to the above mentioned Clarke patent and therefore superior intrinsic electrochemical properties.

OBJECTIVES OF THE PRESENT INVENTION ARE THEREFORE

- to provide cation exchange membranes based on styrene and/or its analogues having superior intrinsic electrochemical properties compared to the cation exchange membranes made from styrene by the classic two step polymerization-sulfonation process
- to provide cation exchange membranes based on styrene and/or its analogues by a process not requiring sulfonation after polymerization
- to provide cation exchange membranes based on styrene and its analogues by a process not requiring water insoluble solvents at any step in said process
- to provide cation-exchange membranes from commercially available (water soluble) monomeric styrene sulfonate salts or polymerizable monomeric analogues thereof and water insoluble vinyl or related crosslinking monomers
- to provide cation exchange membranes by a process which is environmentally friendly
- to provide electrodialysis and related apparatus having cation exchange membranes based on styrene and/or its analogues which apparatus has superior electrochemical properties compared to similar apparatus having similar cation exchange membranes based on styrene and/or its analogues and prepared according to the classic process.

DETAILED DESCRIPTION

The above and other objectives (which will become obvious from the following description, examples and claims) have been achieved by forming an appropriate concentrated liquid solution comprising:

at least one substantially water soluble organic salt comprising as anion monomeric styrene sulfonate and/or polymerizable analogues thereof and as cation a non-polymerizable per-organic onium cation of a strong organic base;

at least one substantially water insoluble vinyl or related crosslinking monomer;

a diluent of which the major amount is selected from the group consisting of water and non-polymerizable, substantially water soluble, organic, polar compounds having boiling points at atmospheric pressure not less than about 100° C.

Optionally the solution may also comprise:

one or more catalysts for polymerization of vinyl and/or related monomers, which catalysts may be active as such or activated by heat, electromagnetic radiation or chemical promoters;

one or more polymerization inhibitors;

minor amounts of polymerizable diluents.

By "onium cations" are meant for example tertiary oxonium cations, tertiary sulfonium cations (e.g. benzyl dimethyl sulfonium), tertiary selenium cations, quaternary ammonium cations (also sometimes called quaternary nitronium cations; e.g. benzyl trimethyl ammonium or benzyl trimethyl nitronium), quaternary phosphonium cations (e.g. tetra phenyl phosphonium). In principle a monomeric onium styrene sulfonate salt (or polymerizable analogue thereof) may be prepared for example by reacting together beta bromoethyl benzene sulfonyl chloride and an onium hydroxide e.g. benzyl trimethyl ammonium hydroxide. It has been discovered however that such monomeric onium styrene sulfonates (or monomeric polymerizable analogues thereof) may be prepared in situ in the polymerizable solution, for example by mixing together in the proportions desired/required in the final polymerizable solution as set forth above:

(a) one or more water soluble, monomeric alkali (or other) metal styrene sulfonate salts and/or one or more polymerizable, water soluble, monomeric analogues thereof (b) one or more water soluble non-polymerizable, organic onium salts of monomeric low molecular weight acids (c) one or more water insoluble crosslinking compounds (d) one or more polar solvents having boiling points in the commercially pure state of not less than about 100° C. at standard atmospheric pressure and selected from the group consisting of water and polar organic solvents having boiling points in the commercially pure state of not less than about 100° C. at atmospheric pressure (e) optionally a soluble, polymerization inhibitor.

A preferred example of such a preparation is given below. The mixture of the four above mentioned classes (a), (b), (c) and (d) constitutes an inter-dependent system as follows:

the members of each class are preferably chosen so that the salt(s) of the alkali (or other) metal cation and the low molecular weight acid anion (resulting from the metathesis of the styrene sulfonate salt and/or analogue (a) and the organic onium salt (b)) are substantially insoluble in the final polymerizable solution;

the members of each class are preferably chosen so that the onium styrene sulfonate and/or analogue "salts-in" (solubilizes) the one or more water insoluble crosslinking compounds. This phenomena is apparently similar to the solubilization of sparingly soluble organic compounds by so-called McKee salts (see e.g. Brit. Pat. 967,956 (1964) for an extensive list of such salts and their use in a commercial electrochemical process for hydrodimerization of acrylonitrile to adiponitrile). The present onium styrene sulfonate salts and polymerizable analogues thereof differ fundamentally in that the anion thereof is a polymerizable ethylenic (vinyl or related) anion;

The members of each class are preferably chosen so that the substantially insoluble highly crosslinked copolymer of the styrene sulfonate anion (and/or polymerizable, monomeric analogue thereof) and of the substantially water insoluble crosslinking compounds remain in a swollen gel state after polymerization (in contrast for example to a precipitated, macroreticular state).

The salt(s) of the alkali (or other) metal cation and the low molecular weight acid anion (substantially insoluble in the liquid polymerizable solution as mentioned above) may be removed from said solution by any one or more techniques for separating solids and liquids well-known in the art for example, settling and decanting, filtration, centrifugation and the like. Preferably the temperature is adjusted to a value at which said insoluble salt has a low solubility in the remaining polymerizable solution but said remaining solution remains relatively fluid (i.e. is not viscous and/or does not solidify). In this connection it is advantageous to choose as the inorganic cation of the styrene sulfonate (or polymerizable analogue thereof) an anion of the organic onium salt entities (b) which will result in substantially insoluble salts having a negative temperature coefficient of solubility or a minimum solubility at a temperature at which the remaining polymerizable solution is conveniently fluid and stable.

Alternatively the monomeric alkali (or other) metal styrene sulfonate salt(s) and/or analogue(s) thereof, (a) above, and organic onium salt(s) of low molecular weight acid(s), (b) above, may be mixed together preferably with warming and with a polymerization inhibitor then extracted with the mixture of water insoluble crosslinking compounds, (c) above, and polar solvents, (d) above, preferably also with polymerization inhibitor. Such latter mixture is preferably also warm and may be a two phase mixture.

The classes (a), (b), (c), (d) and (e) above may all be solids at room temperature as long as the final polymerizable solution is fluid at a convenient temperature. In general the melting points of each of such classes will be depressed by the presence of the other classes. For example 2-pyrrolidone (m.p. about 25° C.), dimethyl sulfoxide (m.p. 18.5° C.), sulfolane (m.p. 27.5° C.) belong to the class of convenient polar solvents.

The metathesis reaction referred to above may be represented by, for example:

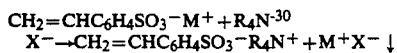

$$CH_2=CHC_6H_4SO_3^-M^+ + R_4N^{-30}$$
$$X^- \rightarrow CH_2=CHC_6H_4SO_3^-R_4N^+ + M^+X^- \downarrow$$

where $M^+$ represents an inorganic cation, R represents organic moieties (typically individually selected from the group consisting of alkyl, aryl, arylalkyl, alkylaryl, hydroxyalkyl, alkoxyalkyl, hydroxyaryl, alkoxyaryl moieties and the like) and $x-$ is typically bromide,, chloride or low ionic weight alkyl sulfate, although it may also be iodide, fluoride, sulfate, nitrate, low molecular weight carboxylate, low molecular weight organic sulfonate less preferably monomeric, non-polymerizable high molecular weight carboxylate, sulfonate or sulfate. Although less preferred, one of the R in the above equation may be hydrogen.

Suitable substantially water insoluble, monomeric crosslinking compounds copolymerizable with such onium sulfonate salts include without limitation the divinyl benzenes, divinyl toluenes, divinyl naphthalenes, divinyl diphenyls, divinyl phenyl vinyl ethers, analogues thereof such as the divinyl dimethyl benzenes, divinyl sulfone, trivinyl cyclohexane, the diacrylates or dimethacrylates of alkane diols (such as ethylene glycol dimethacrylate or tetramethylene glycol dimethacrylate), the tetra acrylates or tetramethacrylates of pentaerythritol and the like.

There may also be present other vinyl or related compounds which are copolymerizable with such crosslinking compounds and the onium styrene sulfonate salts (and/or polymerizable, monomeric analogues thereof) as long as the cation exchange polymer as finally prepared has an equivalent weight of not more than about 1000 (i.e. a cation exchange capacity of not less than about 1 milligram equivalent per gram of polymer) in the sodium form, on a substantially dry basis not including any reinforcing medium. Such other vinyl or related compounds may be more or less unavoidable, for example the ethyl vinyl benzene present in commercial divinyl benzene or may be added for various mechanical or electrochemical purposes. In addition to the above mentioned ethyl vinyl benzenes such vinyl or related compounds may include for example styrene, vinyl toluenes, vinyl naphthalenes, vinyl chlorobenzenes, vinyl xylenes, the alpha substituted alkyl derivatives of the above (such as alpha methyl styrene), the alkyl acrylates or methacrylates, butadiene, isoprene, acrylonitrile and the like.

Suitable polar compounds which can be advantageously employed as non-polymerizable solvents or diluents are those having low frequency dielectric constants greater than about 10, preferably greater than about 30, Hildebrand solubility parameters greater than about 10 cal/$^{0.5}$ cm$^{-1.5}$ and boiling points in the commercially pure state at standard atmospheric pressure of not less than about 100° C. and include without limitation water, low molecular weight amides such as the following:

|  | Boiling Point °C. | Dielectric Constant |
|---|---|---|
| Formamide | 210 | 109 |
| N,N-dimethyl formamide | 153 | 37 |
| N,N-dimethyl acetamide | 164 | — |
| 2-pyrrolidone | 245 | — |
| N-methyl-2-pyrrolidone | 202 | 32.2 |

Also included are, for example, without limitation:

|  | Boiling Point °C. | Dielectric Constant |
|---|---|---|
| Dimethyl sulfoxide | 189 | 49 |
| Propylene carbonate | 242 | 65 |
| Gamma butyrolactone | 204 | 39 |
| 1,4-Butane diol | 228 | 32 |
| 1,3-Propylene glycol | 214 | 35 |
| 1,2-Propylene glycol | 187 | 32 |
| 1,3-Butane diol | 208 | 29 |
| Sulfolane | 287 | 43 |
| Glycerin | 290 | 43 |
| Tetrahydrofurfural alcohol | 178 | — |
| 1,2,4-Butane triol | >200 | — |
| Ethylene Glycol | 198 | 39 |
| 2,3-Butane diol | 180 | — |

For each combination of one or more monomeric, polymerizable, water soluble, alkali (or other metal) styrene sulfonate salts (and/or analogue(s) thereof), one or more non-polymerizable, water soluble, onium salts of a low molecular weight acid and one or more vinyl or related crosslinking compounds copolymerizable with the styrene sulfonate anion (and/or analogue thereof) there appears to be a relatively narrow range of dielectric constant and Hildebrand solubility product of the non-polymerizable solvent or diluent which is optimal. Such solvent or combination of solvents may be easily found by a limited number of tests well within the skill of a technician. For example as illustrated in Example 1 below, for the styrene sulfonate and onium salts used therein, one suitable combination of solvents comprised about 86 parts 2-pyrrolidone and 14 parts water by volume. It is not necessarily true that the solvent having the highest dielectric constant and/or highest Hildebrand solubility product will be the most suitable solvent for any given styrene sulfonate salt (and/or analogue thereof) and onium salt of low molecular weight acid.

In addition to the high boiling polar solvents mentioned above, there may be added minor amounts of polymers such as styrene-butadiene or styrene-isoprene copolymers, polyvinyl alcohol and the like.

After removing insolubles, the polymerizable solution of onium styrene sulfonate(s) (and/or polymerizable analogues thereof) and water insoluble crosslinking compounds will generally be cast in the form of a sheet on a reinforcing medium such as a woven synthetic fabric e.g. of polypropylene, polyacrylonitrile, polyacrylonitrile-co-vinyl chloride, polyvinyl chloride, polyester and the like and caused to polmerize generally at a temperature in the range of from about 40 to about 100° C., preferably from about 60 to about 80° C. Polymerization initiators spontaneously active or activated by heat, electromagnetic radiation or chemical promoters may be added to said polymerizable solution before casting. Anionic, cationic or coordination initiators may be used but generally free radical initiators such as peroxides, hydroperoxides and azo compounds are more convenient. Examples include 2,4-pentanedione, potassium persulfate, hydrogen peroxide, tertiary butyl hydroperoxide, 2,2'azobis (2-amidino propane) dihydrochloride, 4,4'-azobis (4-cyanopentanoic acid). Such initiators are generally used in the range of from about 0.01 to about 2% of the weight of the polymerizable monomers.

EXAMPLE 1

A mixture consisting of about 480 ml of 2-pyrrolidone, about 80 ml of water, about 620 ml of 80% commercial divinyl benzene and about 600 grams of sodium styrene sulfonate is warmed to about 80° C. whereupon about 480 grams of benzyl trimethyl ammonium chloride are added. After about 30 minutes the resulting mixture is cooled to room temperature and then filtered. To the filtered polymerizable solution there are added about 15 grams of an azo free radical catalyst having a 10 hour half life at about 67° C. (available from E. I. duPont de Nemours, Wilmington, Del. under the tradename VAZ0 67). The resulting polymerizable solution is transferred to a Teflon (TM) lined tray having dimensions of about 11 by 12 inches and a height of about 3 inches. Glass plates about 10 by 11 inches and 10 by 11 inch pieces of fabric woven from modacrylic staple fiber are laid in alternating fashion in the tray until the top of the liquid level is reached, care being taken to exclude air bubbles from the fabric. The tray of polymerizable solution, glass plates and fabric is placed in an oven at 80° C. for 17 hours. It is found that the polymerizable solution has become solid. The stack of glass plates and impregnated fabric sheets (the latter the desired cation-selective membranes) is disassembled. The membranes are rinsed thoroughly in 10% sodium chloride solution and then in water (substantially to remove the non polymerizable solvent and the onium cations). The mechanical, ion-exchange and electrochemical properties are recorded in the table below.

COMPARATIVE EXAMPLE

A mixture of styrene, 80% divinyl benzene of commerce, diethyl benzene and benzoyl peroxide is prepared in accordance with the classic process of U.S. Pat. No. 2,731,411 and cast on pieces of the same modacrylic fabric as used in Example 1 above and in the manner described therein. The stack of glass plates and fabric is heated in an oven at 800° C. for 17 hours and after cooling disassembled to recover the protomembranes, i.e., the fabric impregnated with highly crosslinked polystyrene. The protomembranes are thoroughly rinsed in ethylene dichloride (to remove the non-polymerizable diethyl benzene, any unpolymerized monomers and low molecular weight polymers) and then sulfonated at room temperature for 17 hours as described in U.S. 2,962,454. The resulting cation-exchange membranes are thoroughly rinsed in methanol, then in dilute aqueous sodium bicarbonate and finally in water. The mechanical, ion-exchange and electrochemical properties are also recorded in the table below.

TABLE

|  | Example 1 | Comp. Example |
|---|---|---|
| Capacity meg/g | 1.89 | 2.30 |
| Water Content, % | 49 | 46 |
| Thickness, cm | 0.06 | 0.05 |
| Areal Resistance, ohm-cm$^2$ | 10 | 15 |

In the above table: the cation exchange capacity is expressed as milligram-equivalents per gram of dry cation exchange resin in the sodium form (i.e. not including fabric); the water content is expressed as percent by weight of the wet cation exchange resin in the sodium form (i.e. not including fabric); the areal resistance is that of a square centimeter of membrane in the sodium form. It is seen that even with lower cation exchange capacity, essentially the same water content and greater thickness the product of Example 1 has lower electrical resistance, apparently attributable to the more uniform distribution of the sulfonate groups.

EXAMPLE 2

A twenty cell electrodialysis apparatus is assembled using as spacers 9 by 10 inch tortuous path polyethylene spacers about 0.040 inches thick available from Ionics, Inc., Watertown, Mass. U.S.A. The available transfer area per spacer is about 222 sq. centimeters. The electrodes are platinum electroplated titanium. Two of the above spacers are used at each electrode. The anion exchange membranes are AR 103 CZL anion exchange membranes about 0.05 cm thick also available from Ionics, Inc. A synthetic seawater containing about 35 grams per liter of sodium chloride is passed in parallel through the diluting and concentrate chambers of the apparatus at a total rate of about 80 liters per hour (i.e. about 2 liters per hour through each dilute chamber). A separate feed of such synthetic sea water is passed through the electrode chambers at a rate to give a pressure drop through said chambers of about 1 psi less than that through the dilute chambers. A direct current of 20 amperes is applied between the electrodes. It is found that when the apparatus is equipped with cation exchange membranes made in accordance with Example 1 the electrical energy consumption is about 9 kWh per cubic meter of dilute chamber effluent less than when the apparatus is equipped with cation exchange membranes made in accordance with the Comparative Example.

While some embodiments of the present invention have been shown described herein, it will be apparent to those skilled in the art that various modifications and changes can be made without departing from the spirit and scope of the present invention. All such modifications and changes coming within the scope of the appended claims are intended to be covered thereby.

I claim:

1. A cation exchange membrane prepared by polymerizing a homogeneous solution of a mixture of polymerizable monomers, said mixture comprising one or more water soluble, monomeric, styrene sulfonate ammonium salts and divinyl benzene, said mixture in one or more mutual solvents for said one or more styrene sulfonate ammonium salts and divinyl benzene, said one or more mutual solvents comprising from about 20 to about 60 percent by volume of said solution and characterized by substantially swelling the polymerized mixture of said polymerizable monomers, said one or more mutual solvents selected from the group consisting of solvents having boiling points in the commercially pure state of not less than about 100° C. at standard atmospheric pressure, low frequency dielectric constants in excess of about 10 and Hildebrand solubility parameters greater than about 10 cal$^{0.5}$ cm$^{-1.5}$, said solvents further characterized by being soluble in water in all proportions, said mixture of polymerizable monomers comprising at least 0.17 mols of available crosslinks per mol of said one or more styrene solfonate ammonium salts, said membrane characterized by having a cation exchange capacity of at least about 1 milligram-equivalent per gram of dry cation exchange resin in the sodium form.

2. A cation exchange membrane prepared by:
(a) contacting one or more monomeric metal styrene sulfonate salts, one or more non-polymerizable ammonium salts of low molecular weight acids and a solvent or mixture of solvents, said solvent or mixture of solvents characterized by being good solvent for the one or more sulfonate ammonium said first metathesis product of said one or more metal styrene sulfonate salts by said one or more ammonium salts of low molecular weight acids and be being a poor solvent for the one or more salts of said metal(s) and said low molecular weight acids, said last mentioned salts constituting a second metathesis product of said one or more metal styrene sulfonate salts by said one or more ammonium salts of low molecular weight acids, thereby resulting in the formation of a precipitate of said second methathesis product and the formation of a solution of said first metathesis product in said solvent or mixture of solvents;
(b) separting said precipitate and said solution;
(c) polymerizing in sheet form said one or more styrene sulfonate ammonium salt first metathesis product in said solvent or mixture of solvents with divinyl benzene thereby to form cation exchange polymer in sheet form, said solvent or mixture of solvents comprising from about 20 to about 60 percent by volume of the sum of the volumes of said solvent or mixture of solvents, said one or more styrene sulfonate ammonium salt first metathesis product and said divinyl benzene and further characterized by being a swelling agent for said cation exchange membrane, the volume of said divinyl benzene being such that there are at least 0.17 mols of available crosslinks per mol of said one or more styrene sulfonate ammonium salt first metathesis product;
said cation exchange membrane characterized by having a cation exchange capacity of at least about 1 milligram-equivalent per gram of dry cation exchange resin in the sodium form.

3. A cation exchange membrane having a cation exchange capacity of at least about 1 milligram-equivalent per gram of dry cation exchange resin in the sodium form prepared by polymerizing a homogeneous, liquid mixture comprising one or more water soluble, polymerizable, monomeric, styrene sulfonate ammonium salts, at least 0.17 mols of monomeric divinyl benzene per mol of said styrene sulfonate ammonium salts, said mixture also comprising diluent, said diluent comprising from about 20 to about 60 percent by volume of said mixture, said diluent characterized by consisting of one or more entitles selected from the group of compounds which are not substantially copolymerizable with said styrene sulfonate ammonium salts and with said divinyl benzene, have boiling points in the commercially pure state at standard atmospheric pressure of not less than about 100° C. and are miscible with water in all proportions, said diluent further characterized by yielding a mixture containing monomeric styrene sulfonate sodium salt, at least 0.17 ml of monomeric divinyl benzene per mol of said styrene sulfonate sodium salt and from about 20 to about 60 percent by volume of said diluent which latter mixture is not a homogeneous liquid.

4. A cation exchange membrane according to claim 1 in which said homogeneous, liquid mixture comprises N-benzyl-N,N,N-trimethyl ammonium styrene sulfonate at styrene sulfonate ammonium salt.

5. A cation exchange membrane according to claim 1 in which said diluent consists of one or more entities selected from the group consisting of water, formamide, N,N- dimethyl formamide, N,N-dimethyl acetamide, 2-pyrrolidone, N-methyl-2-pyrollidone, dimethyl sulfoxide, propylene carbonate, gamma butyrolactone, 1,4-butane glycol, 1,3-propylene diol, 1,2-propylene glycol, 1,3 butane diol, sulfolane, glycerin, tetrahydro furfural alcohol, 1,2,4-butane triol, ethylene glycol and 2,3 butane diol.

6. A cation exchange membrane prepared according to claim 1 in which said one or more sulfonate ammonium salts is N-benzyl-N,N,N-trimethyl ammonium styrene sulfonate.

7. A cation exchange membrane prepared according to claim 1 in which said one or more mutual solvents is selected from the group consisting of water, formamide, N,N- dimethyl formamide, N,N-dimethyl acetamide, 2-pyrrolidone, N,-methyl-2-pyrrolidone, dimethyl sulfoxide, propylene carbonate, gamma, butyrolactone, 1,4-butane diol, 1,3- propylene glycol, 1,2-propylene glycol, 1,3- butane diol, sulfolane, glycerin, tetrahydro furfural alcohol, 1,2,4-butane triol, ethylene glycol and 2,3-butane diol.

8. An electrodialysis apparatus containing at least one cation exchange membrane prepared according to claim 1.

9. An electrodialysis apparatus containing one or more cation exchange membranes prepared according to claim 6.

10. A cation exchange material in sheet form comprising a polymerizate of a mixture of one or more substantially water soluble polymerizable, monomeric styrene sulfonate ammonium salts with divinyl benzene, said mixture comprising at least 0.17 mols of available crosslinks per equivalent of said one or more styrene sulfonate ammonium salts, said cation exchange material characterized by having a cation exchange capacity of at least about 1 milligram-eqivalent per gram of dry cation exchange material in the sodium form.

* * * * *